(12) United States Patent
Ohishi

(10) Patent No.: US 7,697,744 B2
(45) Date of Patent: Apr. 13, 2010

(54) X-RAY DIAGNOSTIC APPARATUS AND IMAGE PROCESSOR

(75) Inventor: Satoru Ohishi, Otawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 605 days.

(21) Appl. No.: 10/090,746

(22) Filed: Mar. 6, 2002

(65) Prior Publication Data

US 2002/0154801 A1    Oct. 24, 2002

(30) Foreign Application Priority Data

Mar. 6, 2001    (JP) .............................. 2001-062031

(51) Int. Cl.
G06K 9/00    (2006.01)
G06K 9/36    (2006.01)
(52) U.S. Cl. .................. 382/132; 382/131; 382/282
(58) Field of Classification Search ......... 382/128–134, 382/300, 282
See application file for complete search history.

(56) References Cited

U.S. PATENT DOCUMENTS

| | | | | |
|---|---|---|---|---|
| 4,868,747 A | * | 9/1989 | Mori et al. .................. 382/131 |
| 5,623,560 A | * | 4/1997 | Nakajima et al. ............ 382/295 |
| 5,640,462 A | * | 6/1997 | Sato et al. .................... 382/131 |
| 5,671,157 A | * | 9/1997 | Saito ............................ 345/419 |
| 5,699,446 A | * | 12/1997 | Rougee et al. .............. 382/130 |
| 6,047,080 A | * | 4/2000 | Chen et al. ................... 382/128 |
| 6,324,243 B1 | * | 11/2001 | Edic et al. ........................ 378/4 |
| 6,360,027 B1 | * | 3/2002 | Hossack et al. .............. 382/294 |
| 6,487,432 B2 | * | 11/2002 | Slack ........................... 600/407 |

FOREIGN PATENT DOCUMENTS

| | | |
|---|---|---|
| JP | 08-010246 | 1/1996 |
| JP | 08-030769 | 2/1996 |
| JP | 2000-342558 | 12/2000 |

* cited by examiner

Primary Examiner—Wesley Tucker
(74) Attorney, Agent, or Firm—Oblon, Spivak, McClelland, Maier & Neustadt, L.L.P.

(57) ABSTRACT

An image processor and X-ray diagnostic apparatus designate areas of interest, by using an input unit, on at least two of a plurality of still images forming a moving image when continuously displayed, estimate corresponding areas on the remaining images which correspond to the areas of interest by geometrical calculation or the like by using a position detecting section, shift the respective areas of interest and the respective corresponding areas to the image centers of the respective images by using an AFFINE transformation section, and perform continuous display by using the respective images after the shift processing.

44 Claims, 10 Drawing Sheets

FIG. 3A
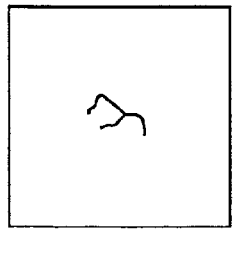
Image a
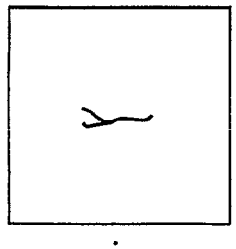
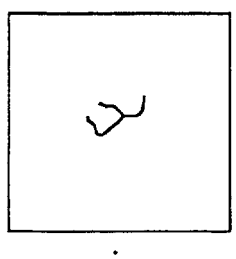
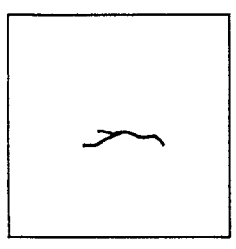
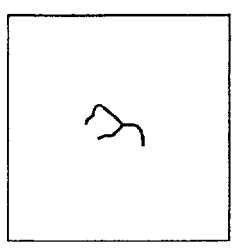
Image z
FIG. 3B
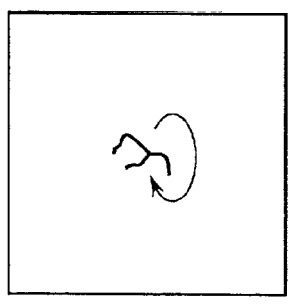
FIG. 4B
FIG. 4A
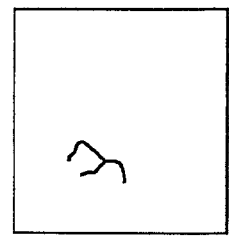
nth frame image
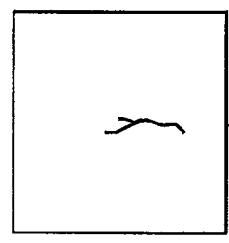
Image C
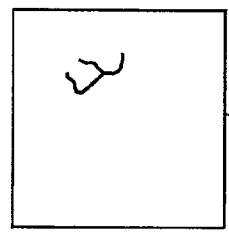
Image B
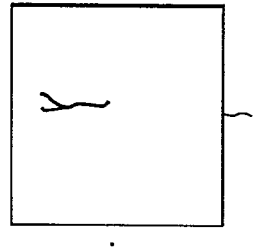
Image A
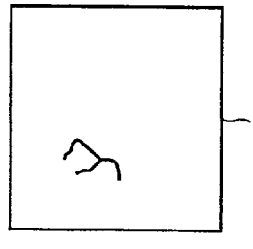
First frame image

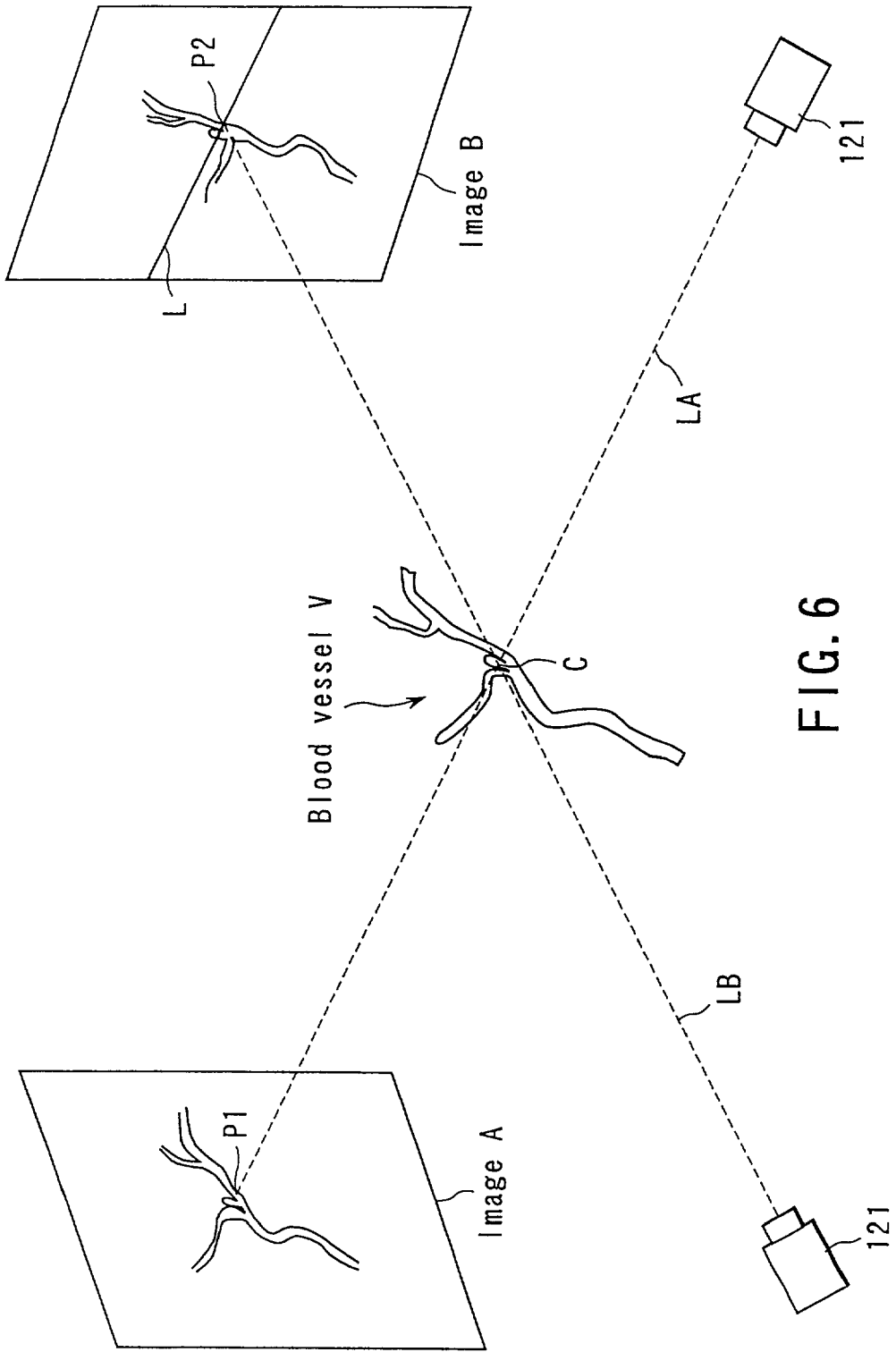
F I G. 6

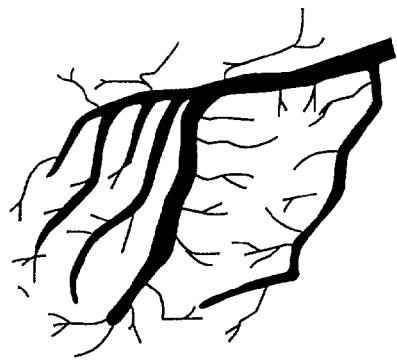 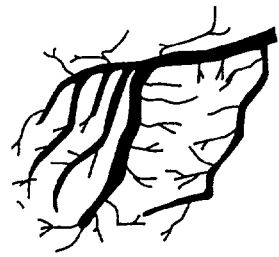
FIG. 8A  FIG. 8B
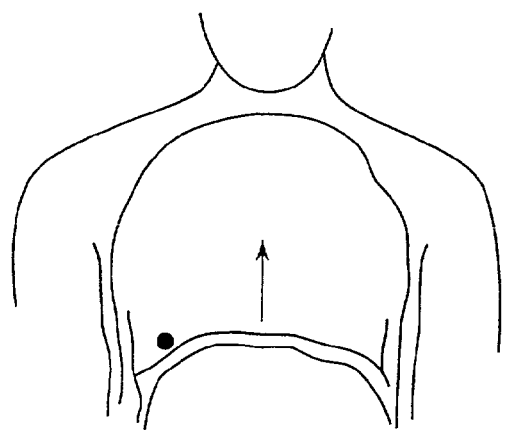 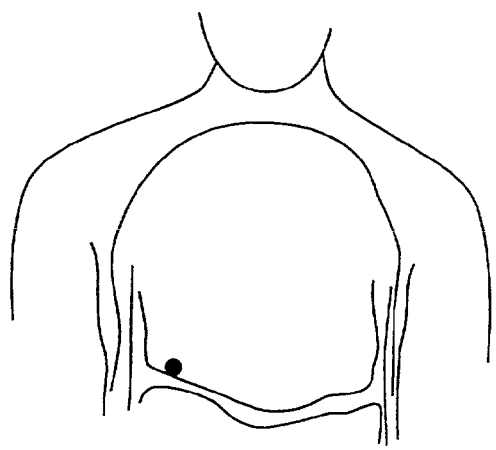
FIG. 9A  FIG. 9B

X-RAY DIAGNOSTIC APPARATUS AND IMAGE PROCESSOR

CROSS-REFERENCE TO RELATED APPLICATIONS

This application is based upon and claims the benefit of priority from the prior Japanese Patent Application No. 2001-062031, filed Mar. 26, 2001, the entire contents of which are incorporated herein by reference.

BACKGROUND OF THE INVENTION

1. Field of the Invention

The present invention relates to an X-ray diagnostic apparatus and image processor.

2. Description of the Related Art

When a moving image is displayed by continuously displaying a plurality of images, the moving image may be observed while a region to be observed (to be referred to as a "region of interest" hereinafter) moves laterally in the image. When images sensed by rotating an imaging system or target are used, in particular, if the target is not located in the rotation center, the target is displayed together with its lateral movement.

It is known that one of the human characteristics is that the power of observation/concentration of an object varies depending on whether the object is largely moving or not. If, therefore, a moving image with a region of interest largely moving is observed, the power of observation/concentration of the region of interest inevitably decreases, resulting in a deterioration in operation efficiency or diagnostic ability.

The present invention has been made in consideration of the above situation, and has as its object to provide an image display apparatus and X-ray diagnostic apparatus which always display a region of interest in an image center to allow an operator to observe the region of interest while keeping the power of observation or concentration high.

BRIEF SUMMARY OF THE INVENTION

To achieve this object, according to an aspect of the present invention, there is provided an X-ray diagnostic apparatus comprising: a designating section which designates a region of interest on not less than one image of a plurality of X-ray diagnostic images forming a moving image, when continuously displayed, on the basis of an input from an operator, a position estimating section which estimates corresponding regions on the remaining images of the plurality of images which correspond to the region of interest, and an image processing section which shifts the region of interest and the respective corresponding regions to appropriate positions on the respective images.

To achieve this object, according to another aspect of the present invention, there is provided an X-ray diagnostic apparatus comprising: a memory which stores a plurality of 2D images forming a moving image of a predetermined diagnosis target when continuously displayed and a 3D image of the predetermined diagnosis target, a designating section which allows an operator to designate a region of interest on the 3D image, a position estimating section which estimates corresponding regions on the plurality of 2D images which correspond to the region of interest on the basis of a position of the region of interest designated on the 3D image, and an image processing section which shifts the corresponding regions to appropriate positions on the respective 2D images.

To achieve this object, according to another aspect of the present invention, there is provided an image processor comprising: a memory which stores a plurality of images forming a moving image when continuously displayed, a designating section which allows an operator to designate a region of interest on not less than one of the plurality of images, a position estimating section which estimates corresponding regions on the remaining images of the plurality of images on the basis of a position of the designated region of interest, and an image processing section which shifts the region of interest and the respective corresponding regions to appropriate positions on the respective images.

To achieve this object, according to another aspect of the present invention, there is provided an image processor comprising: a memory which stores a plurality of 2D images forming a moving image of a predetermined diagnosis target when continuously displayed, and a 3D image of the predetermined diagnosis target, a designating section which allows an operator to designate a region of interest on the 3D image, a position estimating section which estimates corresponding regions on the plurality of 2D images which correspond to the region of interest on the basis of a position of the region of interest designated on the 3D image, and an image processing section which shifts the respective corresponding regions to appropriate positions on the respective 2D images.

BRIEF DESCRIPTION OF THE SEVERAL VIEWS OF THE DRAWING

FIG. 3A is a view schematically showing a plurality of DSA images of a blood vessel which are obtained by 360° rotational imaging, and FIG. 3B is a view schematically showing the form of a diagnosis target when the plurality of DSA images shown in FIG. 3A are continuously displayed;

FIG. 4A is a view schematically showing a plurality of DSA images obtained by 360° rotational imaging with a blood vessel as a diagnosis target not being located in the image center of each of the group of images, and FIG. 4B is a view schematically showing the form of a diagnosis target when the plurality of DSA images shown in FIG. 4A are continuously displayed;

FIG. 6 is a view for explaining an epipolar line and position estimation processing;

FIG. 8A is a view showing a state where the coronary artery is dilated with heartbeat, and FIG. 8B is a view showing a state where the coronary artery is constricted with heartbeat;

FIG. 9A is a view showing a state where the diaphragm moves upward with respiration, and FIG. 9B is a view showing a state where the diaphragm moves downward with respiration;

DETAILED DESCRIPTION OF THE INVENTION

Figure 1:
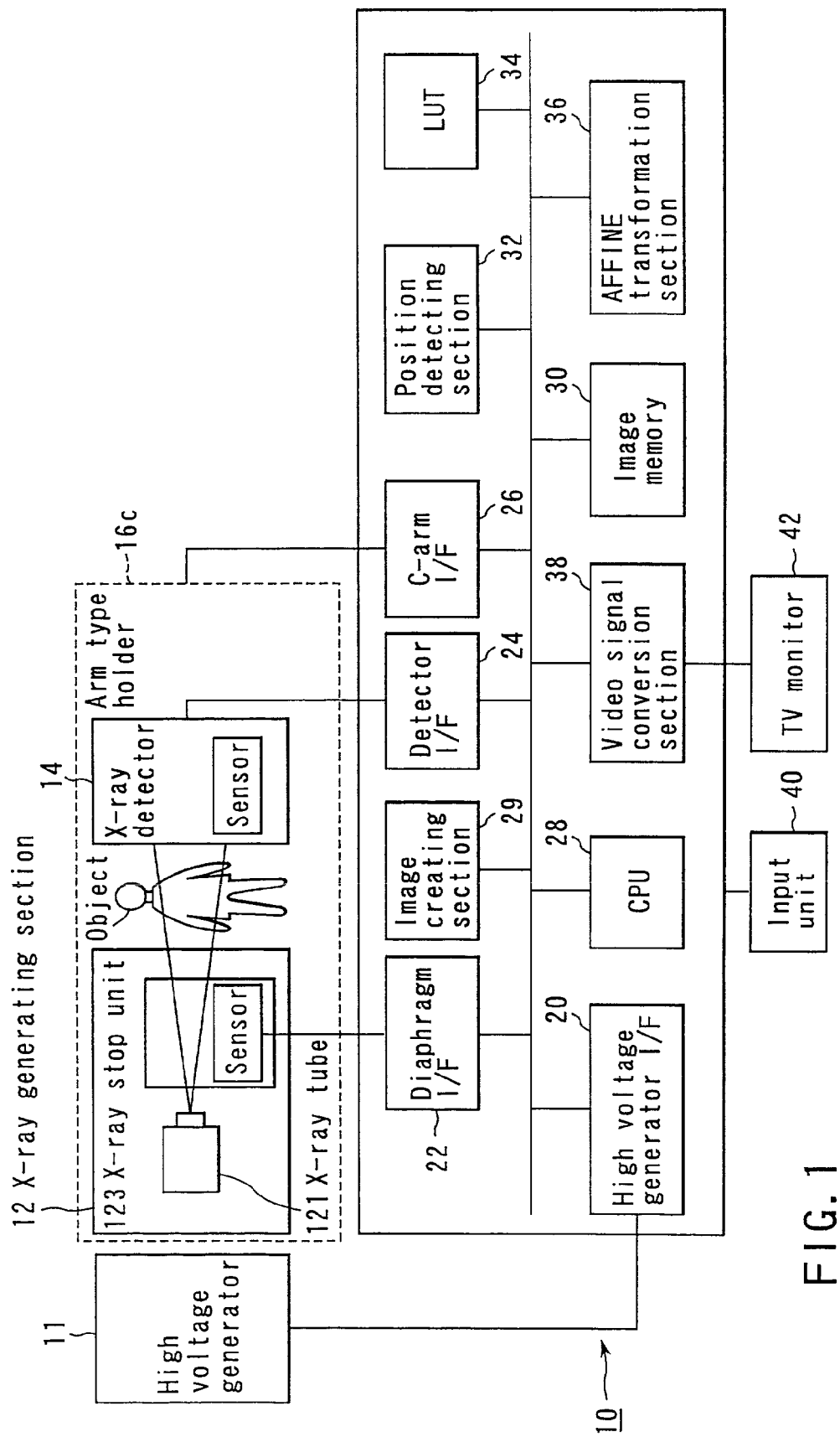
FIG. 1 is a block diagram showing the schematic arrangement of an X-ray diagnostic apparatus 10 according to an embodiment of the present invention.

The first to fifth embodiments of the present invention will be described below with reference to the views of the accompanying drawing. Note that the same reference numerals denote constituent elements having the same functions and arrangements throughout the views of the accompanying drawing, and a repetitive description will be made only when required.

FIRST EMBODIMENT

In the first embodiment, the technical idea of the present invention is applied to an X-ray diagnostic apparatus.

Figure 2:
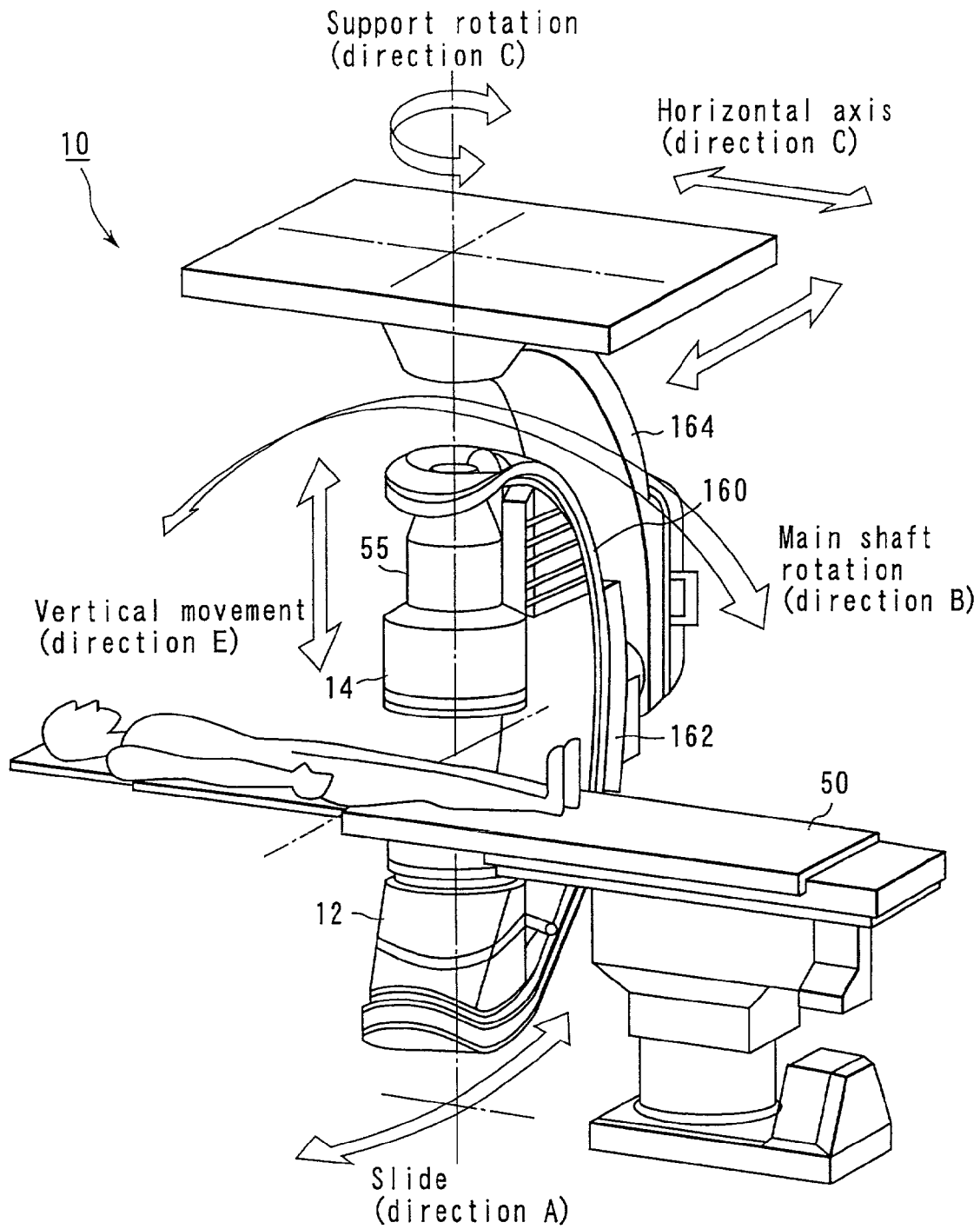
FIG. 2 is a perspective view showing the outer appearance of the X-ray diagnostic apparatus 10.

FIG. 1 is a view showing the schematic arrangement of an X-ray diagnostic apparatus 10 according to the present invention. FIG. 2 is a view showing part of the outer appearance of the X-ray diagnostic apparatus 10.

As shown in FIG. 1, the X-ray diagnostic apparatus 10 includes a high voltage generator 11, X-ray generating section 12, X-ray detector 14, C-arm type holder 16, high voltage generator I/F 20, diaphragm I/F 22, detector I/F 24, C-arm I/F 26, CPU 28, 3D image creating section 29, image memory 30, position detecting section 32, LUT 34, AFFINE transformation section 36, video signal conversion section 38, input unit 40, and TV monitor 42.

The high voltage generator 11 is an apparatus for applying a high voltage to the X-ray generating section 12, and is comprised of a high-voltage transformer, filament heating converter, rectifier, high-voltage switch, and the like.

The X-ray generating section 12 includes an X-ray tube 121 for irradiating an object with X-rays and an X-ray stop unit 123 for collimating the X-rays emitted from the X-ray tube 121. The X-ray tube 121 is a vacuum tube for generating X-rays. The X-ray tube 121 generates X-rays by accelerating electrons using a high voltage generated by the high voltage generator 11 and making the electrons collide with a target. The X-ray stop unit 123 is placed between the X-ray tube 121 and the object to narrow the X-ray beam sent from the X-ray focus of the X-ray tube to a desired image reception size. For example, X-rays are narrowed to prevent unnecessary exposure of the object to X-rays or make a displayed image look more clearly in a diagnosis by the X-ray diagnostic apparatus.

The X-ray detector 14 is comprised of an X-ray plane detector which is relatively thin and has a flat detection surface or an I.I. (Image Intensifier), an optical system, and the like. The X-ray plane detector generates electron holes by causing X-rays transmitted through the object to strike a photoelectric film, stores the holes in a semiconductor switch, and reads them as an electrical signal, thereby detecting an X-ray signal. The I.I. converts X-rays transmitted through the object into optical information through an input phosphor screen, and causes the photoelectrons generated on the basis of the optical information to collide with an output phosphor screen, thereby creating a high-luminance optical image.

The X-ray generating section 12 and X-ray detector 14 are fixed/held on the two end portions of a C-arm 160 to oppose each other (see FIG. 2).

The C-arm type holder 16 is comprised of the C-arm 160, a holder 162 for slidably holding the C-arm 160, and a holder support portion 164 for holding the holder 162 (see FIG. 2). The X-ray generating section 12 is mounted on one end of the C-arm 160, and the X-ray detector 14 is mounted on the other end. These two components are fixed/held to oppose each other through the object (see FIG. 1). A rail is attached to the back surface or a side surface of the C-arm 160. The C-arm 160 can slide on the rail by clamping it between rollers mounted on the holder 162. With this structure, an X-ray image at an arbitrary optical axis angle can be acquired.

The high voltage generator I/F 20 is an interface for transferring a control signal from the CPU 28 which is used to generate X-rays to the high voltage generator 11.

The diaphragm I/F 22 converts control signals associated with operation of the stop and its moving operation from the CPU 28 into a predetermined signal sequence, and transmits it to the X-ray stop unit 123.

The diaphragm I/F 22 also transmits position information from the rotating mechanism portion of the X-ray stop unit 123 to the CPU 28.

The detector I/F 24 receives digital fluoroscopic image data converted into digital data by the X-ray detector 14, and transfers it to the 3D image creating section 29, image memory 30, and the like.

The detector I/F 24 also converts control signals associated with detecting operation/moving operation from the CPU 28 into a predetermined signal sequence, and transmits it to the X-ray stop unit 123.

The diaphragm I/F 22 transmits position information from the rotating mechanism portion of the X-ray detector 14 to the CPU 28.

The CPU 28 performs control associated with acquisition of X-ray fluoroscopic image data and control associated with image processing of acquired image data.

The 3D image creating section 29 receives digital fluoroscopic/sensed image data from the detector I/F 24, and performs predetermined image processing, thereby creating a predetermined X-ray diagnostic image (e.g., mask image, contrast image, or subtraction image). The 3D image creating section 29 also creates voxel volume data on the basis of a plurality of X-ray diagnostic images, and creates a 3D image on the basis of the volume data.

The image memory 30 is a storage section for storing X-ray diagnostic image data for each frame, voxel volume data, and 3D images or storing a plurality of X-ray diagnostic image data sensed by other apparatuses.

The position detecting section 32 performs, for example, estimation associated with a predetermined position on an X-ray diagnostic image in the form to be described later on the basis of information such as the detector size, the angle of the C-arm 160, and SID (the distance between the X-ray source of the X-ray generating section 12 and the X-ray detector 14).

The LUT (Look Up Table) 34 performs grayscale conversion in advance on the basis of a conversion correspondence table of input values and output values.

The AFFINE transformation section 36 performs translation, enlargement, reduction, rotation, and the like (i.e., affine transformation) with respect to a display image. Note that the operation of moving a display image in the affine transformation will be referred to as "shift" hereinafter.

The processing executed by the AFFINE transformation section 36 and position detecting section 32 may be implemented by the CPU 28.

The video signal conversion section 38 converts an input signal sequence of X-ray fluoroscopic image data into a raster signal sequence in a video format.

The input unit 40 includes a keyboard, various switches, a mouse, and the like, and is used to select an image or input position information (to be described later).

The TV monitor 42 displays the reconstructed fluoroscopic image data created by the position detecting section 32.

X-ray image shift processing and image display after the X-ray image shift processing which are executed by the X-ray diagnostic apparatus 10 will be described next with reference to the views of the accompanying drawing.

(Moving Image Display Before Shift Processing)

A case where images obtained by rotational imaging and stored in the image memory 30 are continuously displayed on the TV monitor 42 without performing shift processing (that is, a normal rotational display form) will be described first. This rotational imaging is an imaging method of performing imaging while rotating an imaging system or object. In the case of the X-ray diagnostic apparatus 10 for circulatory organs, this method is an imaging method of acquiring a plurality of X-ray images by performing imaging while rotating substantially the C-arm 160.

In observing a plurality of images that are continuously displayed, continuous image display that can be observed in a form in which it looks as if a diagnosis object were moving (e.g., regular or irregular movement, vibration, or rotation) is sometimes called "moving image display". According to this moving image display, in a case where, for example, DSA images of a blood vessel which are associated with rotational imaging are continuously displayed, the blood vessel can be displayed in the form in which it looks as if the blood vessel were rotated/moved (to be referred to as pseudo-rotational display" hereinafter, that is, "pseudo-rotational display" is special operation of "moving image display").

FIG. 3A schematically shows a plurality of DSA images (Digital Subtraction Angiography images) of a blood vessel which are obtained by 360° rotational imaging.

When the DSA images shown in FIG. 3A are sequentially displayed from images a to z on the TV monitor 42 at predetermined time intervals, an observer can observe a blood vessel in the form in which it looks as if the blood vessel rotated about the image center.

In this case, in order to properly realize the above pseudo-rotational display, it is important to locate a diagnosis object as a rotation target in the center of an image. That is, in pseudo-rotational display, since a plurality of DAS images associated with rotational imaging are continuously displayed, if the diagnosis object (a blood vessel with a contrast medium in FIG. 3) displayed on each DAS image is not located in the image center, the diagnosis target displayed in the form in which it looks as if the target were moved vertically and horizontally.

FIG. 4A schematically shows a plurality of DSA images obtained by 360° rotational imaging, which are a group of images with a blood vessel as a diagnosis target not being located in the center of each image.

When the DSA images shown in FIG. 4A are sequentially displayed, from images A to E, on the TV monitor 42 at predetermined time intervals, the observer observes that the blood vessel rotates about the image center, as shown in, for example, FIG. 4B. As a consequence, the power of observation and concentration inevitably decrease, resulting in a deterioration in work efficiency or diagnostic ability.

(X-ray Image Shift Processing)

X-ray image shift processing executed by the X-ray diagnostic apparatus 10 according to the present invention to perform proper pseudo rotational display will be described with reference to FIG. 5. This X-ray image shift processing is performed to move a region of interest of each display image to a desired position (to be referred to as an "appropriate position" hereinafter) on the image.

Note that the "region of interest" is a predetermined region in an image (e.g., a DSA image) to be rotated/displayed by the observer at a predetermined position on the image. An appropriate position may be set at any position on an image. For the sake of simple explanation, assume that an appropriate position is the center of an image in the following description. In this case, the rotation center of pseudo rotational display coincides with a region of interest.

Figure 5:
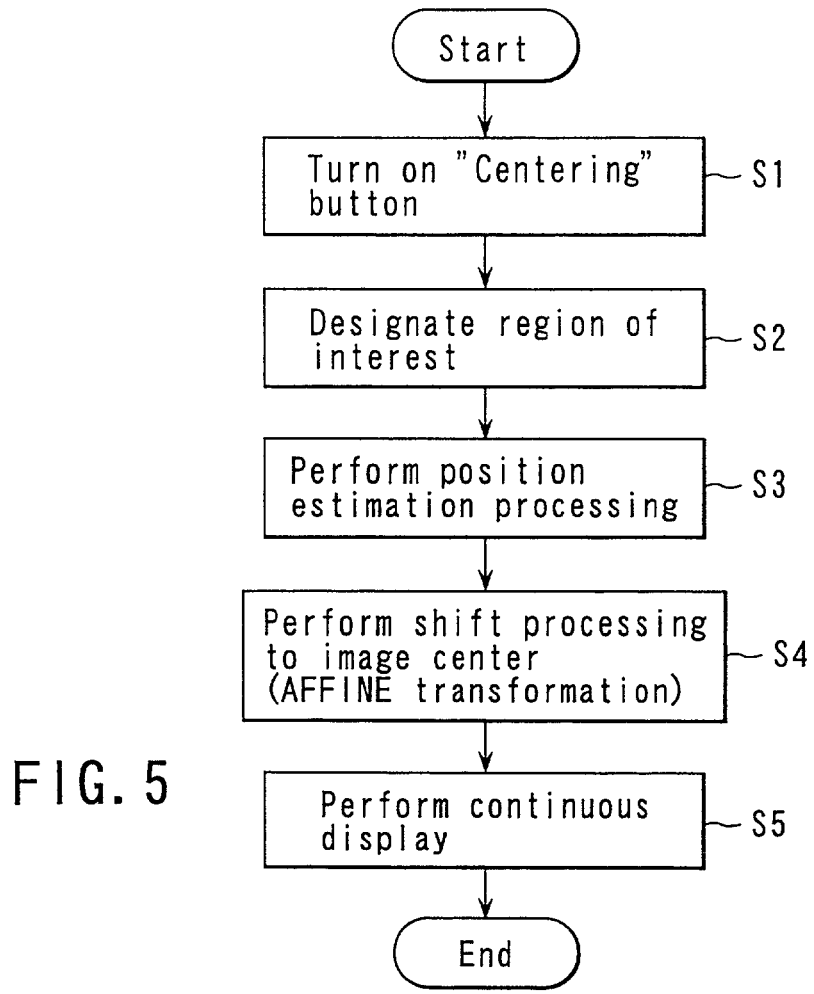
FIG. 5 is a flow chart showing the flow of X-ray shift processing.

FIG. 5 is a flow chart showing the flow of X-ray image shift processing.

Referring to FIG. 5, if a diagnosis target moves within an image once pseudo rotational display is performed, the input unit 40 is operated to turn on a "Centering" button (step S1). With this processing, this apparatus shifts to the shift processing execution mode.

The flow then advances to step S2 for the designation of a region of interest. In this step, the following processing is performed. Note that as a region of interest in this embodiment, a region having almost the same size as that of a tumor formed in a blood vessel or the like may be conceivable. Since a region of interest serves as a reference for shift processing as described later, even a point (e.g., one point designated by a cursor) may effect the same object. For the sake of simplicity, assume that in step S2, one point is designated as a region of interest.

First of all, of a plurality of DSA images obtained by rotational imaging, for example, the first frame image (the frame image sensed for the first time) and the frame image nearest to the first frame image at a vertical angle are displayed side by side. For example, in FIG. 4A, a combination of the first frame image and the image A or a combination of the images A and B may be conceivable.

Subsequently, for example, a region of interest on the image A is designated first by using the input unit 40. As a consequence, an epipolar line L based on the region of interest on the image A is displayed on the image B displayed beside the image A.

FIG. 6 is a view for explaining an epipolar line and position estimation processing (to be described later). Referring to FIG. 6, reference symbol P1 denotes a region of interest designated on the image A; P2, a region of interest designated on the image B; and V, a blood vessel (aneurysm) as a diagnosis target.

Referring to FIG. 6, consider a line $L_A$ connecting the region P1 of interest on the image A and the focal position of the X-ray tube 121 in sensing the image A. The line L obtained by projecting this straight line $L_A$ on the image B by using the X-ray tube 121 located at the position where the frame image B is sensed is the epipolar line L associated with the straight line $L_A$.

As a region of interest on the image B, the predetermined position P2 on the epipolar line L is designated. This is because an aneurysm as a diagnosis target is always located on the epipolar line L.

The position detecting section 32 then performs processing for estimating the position of a region of interest on each of the remaining DSA images (step S3). For example, this position estimation processing is executed as follows on the basis of at least one of each region of interest designated on each of the frame image described above, SID, image-receiving surface size, and angle information of the C-arm 160 for each DSA image, and the like.

First of all, as shown in FIG. 6, the position detecting section 32 calculates a straight line $L_B$ connecting the region P2 of interest on the image B and the focal position of the X-ray tube 121 in sensing the image B, and also calculates an intersecting point C of the straight line $L_A$ and the straight line $L_B$. This intersecting point C corresponds to the 3D position of a diagnosis target (aneurysm) actually existing in the object. Although an intersecting point is obtained in this case, no intersecting point actually exists due to a designation error or the like in many cases. In such a case, an intersecting point is calculated as the midpoint between points nearest to the straight lines $L_A$ and $L_B$.

The position detecting section 32 then projects the intersecting point C on each DSA image by obtaining a straight line connecting the intersecting point C and the focal position of the X-ray tube 121 in sensing each image. The projection position of the intersecting point C becomes a position estimated as a region of interest on each of the remaining DSA images. The pieces of region-of-interest information on the respective DSA images, obtained in this manner, are automatically transferred as a position table (the positions of the regions of interest on the first frame image to the last frame image) to the AFFINE transformation section 36.

The AFFINE transformation section 36 performs AFFINE transformation for the respective DSA images to shift the regions of interest to the image centers on the basis of the above position table (step S4). As a consequence, for example, the DSA images in the form shown in FIG. 4A can be converted into images with the regions of interest shifted to the image centers as shown in FIG. 3A by this AFFINE transformation processing.

The respective DSA images after shift processing are continuously displayed on the TV monitor 42 after they undergo grayscale conversion by the LUT 34 (step S5).

In this embodiment, only the rotational imaging by the X-ray apparatus is described. However, the present invention is not limited to this, and includes images sensed by any rotational imaging system.

In the X-ray diagnostic apparatus described above, of a plurality of still images forming a moving image when continuously displayed, desired regions (e.g., regions of special interest) are specified with respect to some (at least two) of the images. With respect to the remaining images, corresponding regions which correspond to the regions of interest are estimated by geometrical calculation or the like, and the region of interest or corresponding region on each image is then shifted to a corresponding image center. If, therefore, images after shift processing are continuously displayed, the region of interest is always displayed in the image center. This therefore eliminates the necessity to shift the viewpoint. As a result, the observer can observe the region of interest with the power of observation or concentration being kept high.

SECOND EMBODIMENT

In the second embodiment, the present invention is applied to a general image processor (including an apparatus incorporated in a medical image diagnostic apparatus). This embodiment greatly differs from the first embodiment in a method of estimating a region of interest. In the first embodiment, since the present invention is applied to an X-ray diagnostic apparatus and an image processor incorporated therein, a region of interest on each DSA image can be estimated on the basis of information associated with an imaging system (e.g., SID, image-receiving surface size, information such as the angle of the C-arm 160, and the like, as described above). In an image processor having no special imaging system like an X-ray diagnostic apparatus, when the above shift processing is to be performed for a plurality of images forming a moving image when continuously displayed, position estimation must be performed by another method. The second embodiment will be described below with particular emphasis on position estimation processing.

Figure 7:
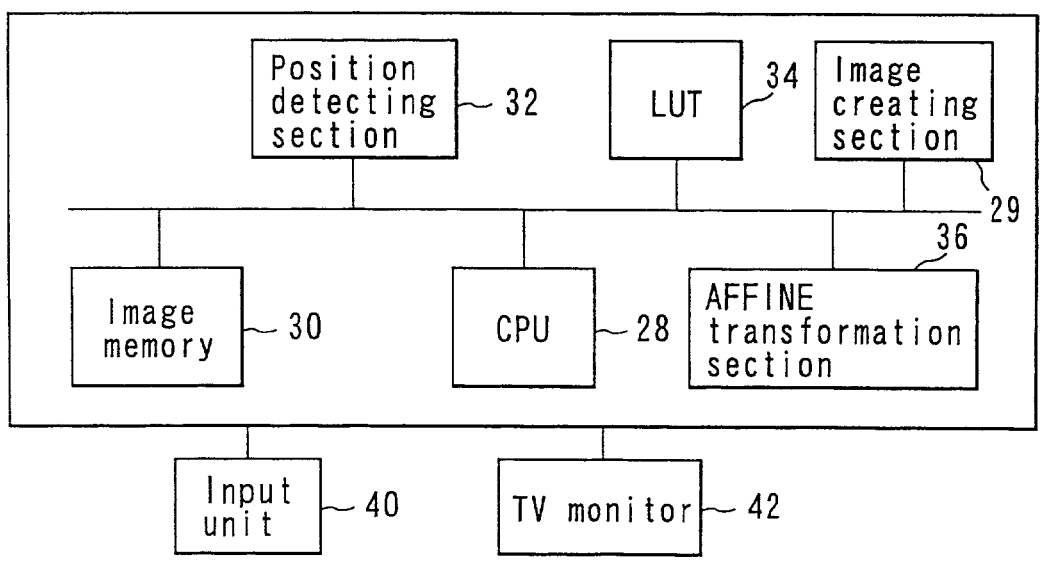
FIG. 7 is a block diagram showing the schematic arrangement of an image processor 60 according to the first embodiment.

FIG. 7 is a view showing the schematic arrangement of an image processor 60 according to the second embodiment.

A plurality of still image data constituting a moving image are stored in an image memory 30.

A position detecting section 32 calculates the locus drawn by a region of interest in imaging operation by using a method to be described later, and estimates a region of interest on each image on the basis of the locus.

(Image Shift Processing)

Image shift processing which is executed by the image processor 60 according to the present invention to realize appropriate pseudo-rotational display will be described next. Note that the flow of image shift processing executed by the image processor 60 is almost the same as that described with reference to the flow chart of FIG. 5, and hence will be described below with reference to FIG. 5.

Referring to FIG. 5, if, for example, an observation target moves within an image once a moving image is temporarily displayed, a "Centering" button is turned on by using an input unit 40 (step S1). With this processing, this processor shifts to the shift processing execution mode.

The flow then advances to step S2 to designate a region of interest, and the following processing is performed.

First of all, for example, of all frame images, a plurality of frame images selected in advance as initial settings, e.g., the first frame, the frame image at the ⅓ position in all the images, the frame image at the ⅔ position in all the images, and the last frame image, are displayed side by side. If, for example, a target image group is a group of 180 frame images, the first frame image, 60th frame image, 120th frame image, and 180th frame image which is the last image correspond to the selected images.

A region of interest is then designated on each of the frame images displayed side by side by using the input unit 40. The position information of the region of interest on each image is automatically transferred to the position detecting section 32.

The position detecting section 32 calculates the locus of each region of interest in imaging operation on the basis of the position information, and calculates the position of a region of interest on each of the remaining frame images, on which no region of interest has been designated, by interpolation, thereby executing position estimation processing (step S3).

The pieces of position information about the regions of interest on the respective images which are calculated by this calculation are complied as a position table (the positions of the regions of interest of the first frame to the last frame) and transferred to an AFFINE transformation section 36.

Note that the above regions of interest may be calculated by using a method of obtaining a function that is satisfied by each region of interest designated by, for example, a high-order approximate function (e.g., a cubic Spline), B-Spline function, or Bezeir function.

The AFFINE transformation section 36 then performs AFFINE transformation for each image to shift the region of interest to the image center on the basis of the position table described above (step S4). As a consequence, if the respective DSA images before the shift processing are in the form shown in FIG. 4A, images with regions of interest shifted to the image centers as shown in FIG. 3A can be obtained by the AFFINE transformation.

The respective DSA images after the shift processing are subjected to grayscale conversion in a LUT 34 and then continuously displayed on a TV monitor 42 (step S5).

With the above shift processing, an arbitrary motion can be displayed with a region of interest being always located in the image center. This makes it possible to observe diagnostic images while keeping the power of observation or concentration high.

EXAMPLE 1

A specific example of clinical application of an image processor 60 according to this embodiment will be described next.

For example, in some case, motion caused by heartbeat makes it difficult to observe a coronary artery constriction (narrowing of a valve of a blood vessel) or the like.

FIGS. 8A and 8B are views showing two of a plurality of diagnostic images of the coronary artery which are sensed without moving an imaging system and the observation target. FIG. 8A shows a state where the coronary artery is dilated by heartbeat. FIG. 8B shows a state where the coronary artery is constricted by heartbeat. An example of facilitating observation of the constriction of the moving coronary artery by shift processing performed by the image processor 60 will be described with reference to FIGS. 8A and 8B.

Since the coronary artery (cardiac blood vessel) moves in synchronism with heartbeat, the position of a region of interest (x1(t), y1(t)) on each image is estimated by the following function in this embodiment.

$$\begin{cases} x1(t) = a0 + \sum_{n=1}^{N} an \cos \frac{2\pi nt}{T1} + \sum_{n=0}^{N} bn \sin \frac{2\pi nt}{T1} \\ y1(t) = c0 + \sum_{n=1}^{N} cn \cos \frac{2\pi nt}{T1} + \sum_{n=0}^{N} dn \sin \frac{2\pi nt}{T1} \end{cases} \quad (1)$$

where T1 is the period of heartbeat, which can be obtained from an electrocardiogram. In addition, in this embodiment, for the sake of simplicity, the case of N=1 will be considered.

Mathematical expression (1) has six unknowns, i.e., a0, a1, b1, c0, c1, and d1 when N=1. Mathematical expression (1) can be uniquely determined and each region of interest can be grasped as a function of time t by providing the coordinates of three regions of interest. That is, the position of a region of interest on each image can be estimated by designating regions of interest on three different images using an input unit 40.

Since the locus of a region of interest can be grasped as a function of time t, a region of interest on each image can be estimated in correspondence with the time information of each of a plurality of sensed diagnostic images. Each estimated region of interest is shifted to the image center in accordance with the contents described above.

In the above case, in order to determine six unknowns, at least the coordinates of three regions of interest are provided as necessary information. From the viewpoint of precision, however, mathematical expression (1) may be uniquely determined on the basis of the coordinates of more regions of interest.

EXAMPLE 2

Another specific example of clinical application of an image processor 60 according to this embodiment will be described next.

In an attempt to observe a tumor near the diaphragm, since the diaphragm moves with respiration, the tumor also moves in synchronism with respiration. This may make it difficult to observe the tumor.

FIGS. 9A and 9B are views showing two of a plurality of diagnostic images of a portion near the diaphragm which are sensed without moving an imaging system and observation target. FIG. 9A shows a state where the diaphragm moves upward due to respiration. FIG. 9B shows a state where the diaphragm moves downward due to respiration. An example of facilitating observation of the tumor near the diaphragm by shift processing performed by the image processor 60 when the movement of the tumor due to respiration makes it difficult to observe the tumor.

Since the diaphragm and tumor move in synchronism with respiration, the position of a region of interest (x2(t), y2(t)) on each image can be estimated by the following function in this embodiment.

$$\begin{cases} x2(t) = e0 + \sum_{n=1}^{N} en \cos \frac{2\pi nt}{T2} + \sum_{n=1}^{N} fn \sin \frac{2\pi nt}{T2} \\ y2(t) = g0 + \sum_{n=1}^{N} gn \cos \frac{2\pi nt}{T2} + \sum_{n=1}^{N} hn \sin \frac{2\pi nt}{T2} \end{cases} \quad (2)$$

where T2 is the period of respiration. The specific value of T2 can be obtained on the basis of the movement of the diaphragm in a moving image or the value detected by a pressure sensor attached to a tourniquet wound around the abdomen of a patient.

Since mathematical expression (2) has the same form as that of mathematical expression (1), mathematical expression (2) can be uniquely determined and a region of interest on each image can be estimated according to the procedure in Example 1.

(Modification)

A modification of the image processor 60 according to this embodiment will be described next.

(1) According to the above description, the number of frame images on which regions of interest are designated by the input unit 40 is fixed. It is, however, preferable that the number of frame images be arbitrarily changed.

In addition, an approximate function for obtaining the locus of a region of interest may be arbitrarily selected from a plurality of types of functions. According to a selection method in this case, for example, a button "FUNCTION" is included in a toolbar in a display window, and a plurality of types of functions are included in a pull-down menu of the button. When a desired function is selected from these functions, the function is selected as a position estimation function. At this time, the selected function is preferably checked on the menu to show the operator which function is currently selected as a position estimation function at a glance.

In addition, the number of frame images on which regions of interest are designated may be changed in accordance with a selected function. This is because the necessary minimum number of functions for approximation may differ depending on the function selected.

(2) This apparatus may be configured to automatically select a function depending on a predetermined function as described next instead of manually selecting a desired function as in (1).

Assume that when a moving image is displayed in the above described manner, the region of interest on a given image deviates from the image center to result in difficulty in observation. In this case, moving image display is stopped at the image on which the region of interest is displayed at a position deviated from the image center, and the position of a region of interest is designated again on the image. For example, this designating operation is performed by designating a position while pressing the [SHIFT] key to discriminate the operation from the operation of designating a normal region of interest.

In response to this operation, a CPU 28 determines that the position of a region of interest is added, and controls the position detecting section 32 to perform position estimation again by using the newly input region of interest and all the regions of interest that have already been input. At this time, if, for example, high-order approximation is selected at [FUNCTION], a cubic function is switched to a quartic function, and the order is sequentially increased if designation of a region of interest as a point is added, thereby performing high-order approximation. This makes it possible to determine a specific approximate function.

The above image processor is configured to specify regions of interest on some (at least two) of a plurality of still images forming a moving image when continuously displayed, estimate corresponding regions on the remaining images which correspond the regions of interest by analytical means or the like, and shift the region of interest or corresponding region on each image to the image center. If, therefore, images after shift processing are continuously displayed, the regions of interest are always displayed in the centers of the respective images, thereby eliminating the necessity to move the viewpoint. As a consequence, the observer can observe the region of interest while keeping the power of observation and concentration high.

THIRD EMBODIMENT

The third embodiment of the present invention will be described next.

According to the third embodiment, an X-ray diagnostic apparatus or image processor is designed to designate regions of interest on all X-ray diagnostic images by one region-of-interest designating operation and perform image shift processing. Note that the X-ray diagnostic apparatus or image processor according to this embodiment has the same arrangement as that shown in FIG. 1 or 7. For the sake of a simple explanation, assume that 360 images acquired at 1° intervals with a diagnosis target serving as a rotation center.

Figure 10:
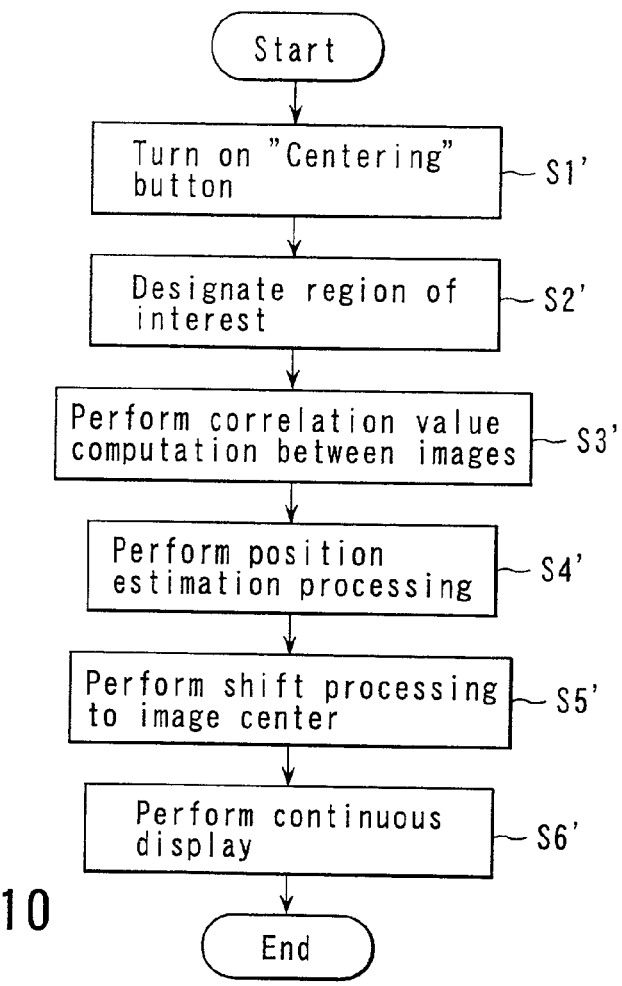
FIG. 10 is a flow chart showing a procedure for shift processing executed by the X-ray diagnostic apparatus or image processor according to the third embodiment.

FIG. 10 is a flow chart showing a procedure for shift processing executed by the X-ray diagnostic apparatus or image processor according to this embodiment. As shown in FIG. 10, first of all, the "Centering" button is turned on by operating an input unit 40 to shift to the shift processing executing mode (step S1').

A region of interest is designated on a desired image by using the input unit 40 (step S2').

Correlation value computation associated with pixel values between adjacent images is performed on the basis of the designated region of interest (step S3').

Figure 11:
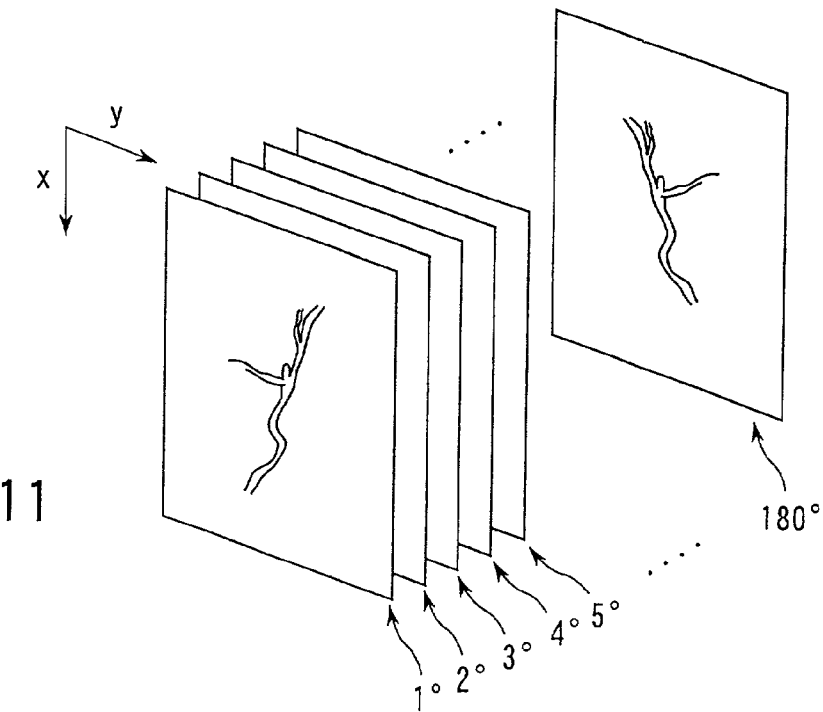
FIG. 11 is a view for explaining correlation value computation.

FIG. 11 is a view for explaining the correlation value computation in step S3'. Referring to FIG. 11, a point $P_1$ on the first image is the region of interest designated in step S2'. Letting (x, y) be the coordinates of a pixel corresponding to a region $P_1$ of interest on the ith image, and $I_i(x, y)$ be the pixel value, the correlation value computation in step S3 is executed between the adjacent images according to equation (1) given below.

$$C_{i+1}(\Delta x, \Delta y) = \iint \{I_i(x, y) - I_{i+1}(x+\Delta x, y+\Delta y)\}^2 dxdy \quad (3)$$

In this case, the integration interval is defined by $(-\Delta w \leq x \leq \Delta w, -\Delta w \leq y \leq \Delta w$ where $\Delta w$ is a predetermined amount), i is a natural number defined by $1 \leq i \leq 360$, and $\Delta x$ and $\Delta y$ are movement amounts from the coordinates (x, y) of the pixel corresponding to $P_i$. This correlation value computation is executed among all adjacent images. On the other hand, in the modification described later, the correlation value computation is executed among a part of the adjacent images.

The position of a region of interest on each image is estimated on the basis of each correlation value (step S4'). More specifically, in each of the remaining images, a position $(x+\Delta x, y+\Delta y)$ determined by $\Delta x$ and $\Delta y$ that minimize a correlation value $C_{i+1}(\Delta x, \Delta y)$ obtained by equation (3) is estimated as a position corresponding to the region of interest on the first image designated in step S2'.

The pieces of region-of-interest information about the respective images obtained in this manner are automatically transferred as a position table (the positions of the regions of interest on the first frame image to the 360th frame image) to an AFFINE transformation section 36. The AFFINE transformation section 36 performs AFFINE transformation for each DSA image to shift the region of interest to the image center on the basis of the position table (step S5').

The respective images after shift processing are subjected to grayscale conversion in an LUT 34 and continuously displayed on a TV monitor 42 (step S6').

According to the above description, a region of interest is designated on the first image in step S2'. However, the ordinal number of one X-ray image to be designated need not be specified. Letting k be the image number at which a region of interest is designated in step S2', the correlation value computation in step S3' is generally expressed by (i) for $i \leq k$ $$C_{i-1}(\Delta x, \Delta y) = \iint \{I_i(x, y) - I_{i-1}(x+\Delta x, y+\Delta y)\}^2 dxdy \quad (4)$$

(ii) for $i > k$ $$C_{i+1}(\Delta x, \Delta y) = \iint \{I_i(x, y) - I_{i+1}(x+\Delta x, y+\Delta y)\}^2 dxdy \quad (5)$$

The correlation value computation in step S3' is not limited to equations (4) and (5). For example, this computation may be performed on the basis of the normal correlation function obtained by normalizing equation (3) or the like or the phase correlation function obtained by a Fourier transform of equation (3) or the like.

(Modification)

In the above example, the correlation value computation is executed among all adjacent images. On the other hand, from the viewpoint of shortening the computation time, the configuration may be adopted as following. That is, the correlation value computation is executed among a part of the images which is adjacent to the pre-registered angle. In addition, region of the interest on each of the remaining images is estimated in accordance with the contents described above.

For example, it is assumed that the pre-registered angle for computation of the correlation value is 10° which is from the 0° to the 10°. In this case, a region of interest on the image at the 0° is designated by using the input device 40. On the other hand, the correlation value computation is executed among the adjacent images corresponding to 10 frames from the 0° to the 10°.

On the basis of the region of interest designated by user on the image at the 0° and the region of interest estimated by the computation of the correlation value, the 3D position of the region of interest can be calculated, for example, by using the epipolar line described in the first embodiment. Therefore, each of the region of interesting on the remaining images can be estimated by projection of the 3D position of the region of interest on the remaining images.

Note that, in this configuration, it is preferable that the pre-registered angle for computation of the correlation value is at an angle of 10 °~30°, approximately.

According to the above arrangement, areas of interest on all images used for moving image display can be designated by designating only a region of interest on one image. This therefore makes it possible to reduce the operation load on the operator and improve the operation efficiency.

If, therefore, images after shift processing are continuously displayed, the region of interest is always displayed in the image center. This therefore eliminates the necessity to shift the viewpoint. As a result, the observer can observe the region of interest with the power of observation or concentration being kept high.

FOURTH EMBODIMENT

The fourth embodiment of the present invention will be described next.

In the fourth embodiment, an X-ray diagnostic apparatus or image processor will be described, which is designed to designate areas of interest on all X-ray diagnostic images for moving image display by designating a region of interest on a 3D image such as a 3D angiogram once and perform image shift processing. The arrangement of the X-ray diagnostic apparatus or image processor according to this embodiment is the same as that shown in FIG. 1 or 7.

Figure 12:
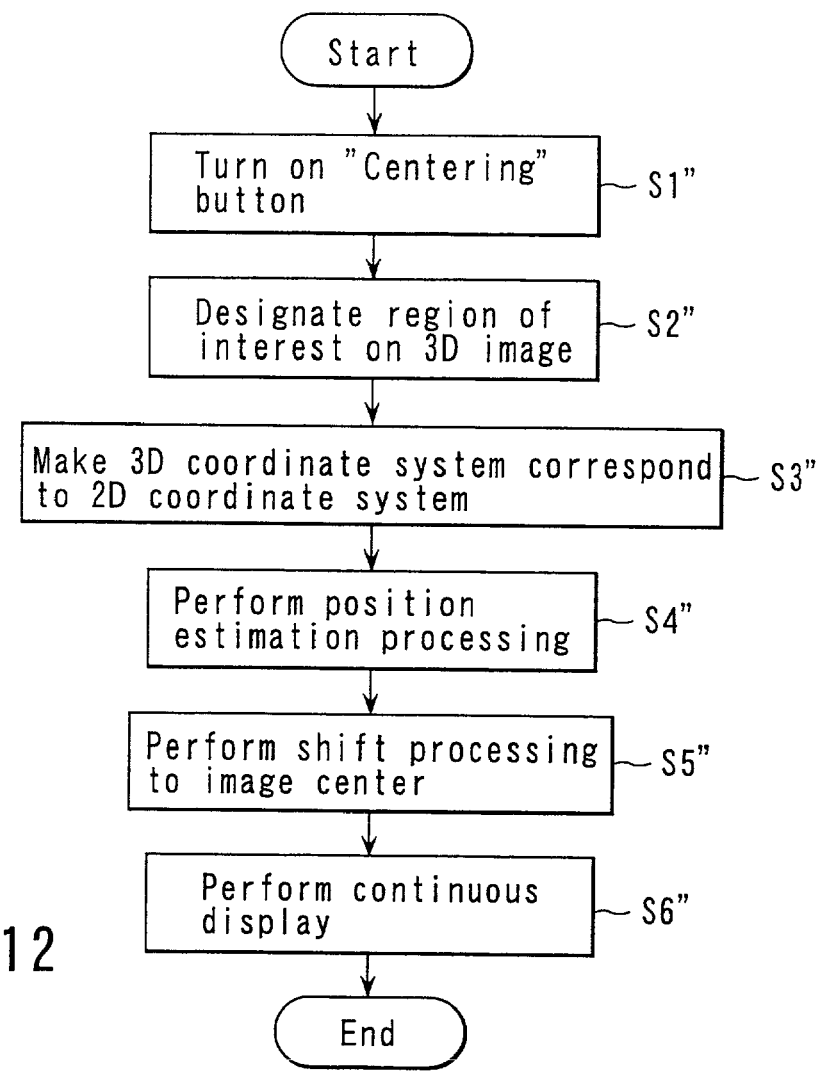
FIG. 12 is a flow chart showing a procedure for shift processing executed by an X-ray diagnostic apparatus or image processor according to the fourth embodiment.

FIG. 12 is a flow chart showing a procedure for shift processing executed by the X-ray diagnostic apparatus or image processor according to this embodiment. As shown in FIG. 12, first of all, the "Centering" button is turned on by operating an input unit 40 to shift to the shift processing executing mode (step S1").

Figure 13:
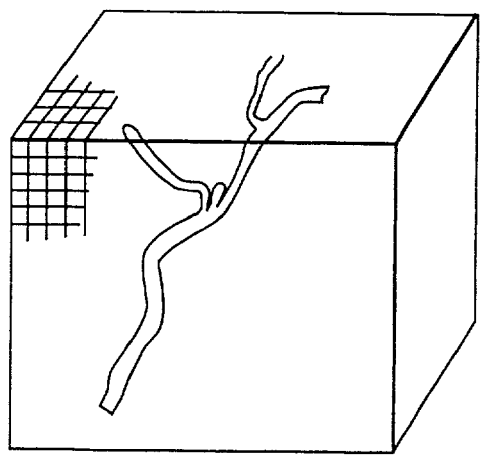
FIG. 13 is a conceptual view for explaining shift processing executed by the X-ray diagnostic apparatus or image processor according to the fourth embodiment.

A region of interest is designated on the 3D image displayed on a TV monitor 42 by using the input unit 40 (step S2"). As shown in FIG. 13, a voxel corresponding to the designated region of interest is specified by a position estimating section 32.

A 3D coordinate system in which voxel data is defined is made to correspond to a 2D coordinate system in which X-ray images are defined (step S3"). This operation of making the 3D coordinate system correspond to the 2D coordinate system is executed on the basis of at least one of the image-receiving surface size of an X-ray detector 14, the angle information of a C-arm 160 for each DSA image, and the like.

Figure 14:
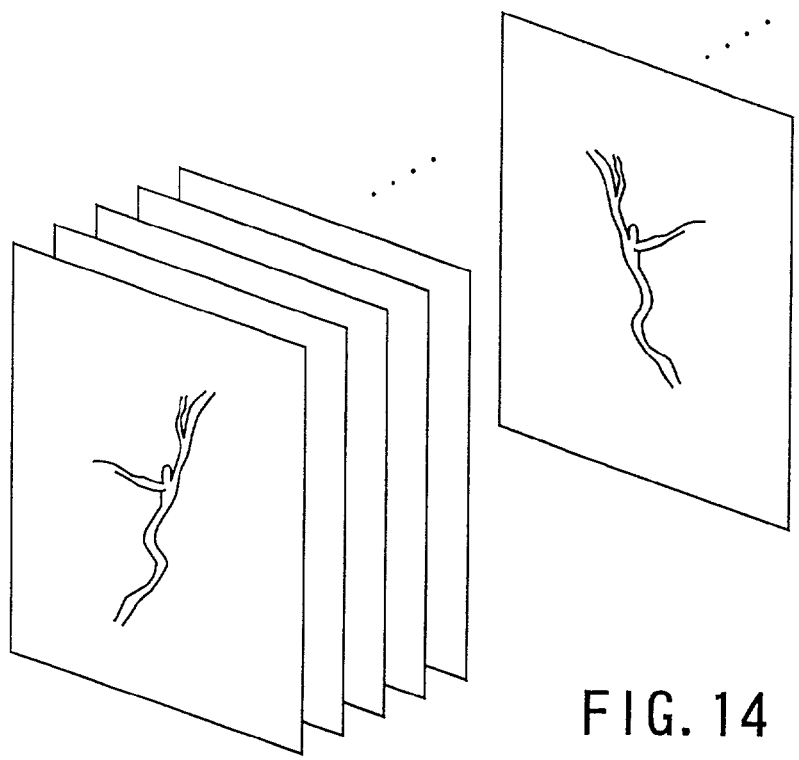
FIG. 14 is a conceptual view for explaining shift processing executed by the X-ray diagnostic apparatus or image processor according to the fourth embodiment.

Subsequently, as shown in FIG. 14, positions on all 2D images used for moving image display which correspond to the region of interest designated on the 3D image are estimated (step S4"). This position estimation is executed by mapping the region of interest designated on the 3D image in all the 2D images used for moving image display on the basis of the correspondence obtained in step S3".

The pieces of region-of-interest information about the respective images obtained in this manner are automatically transferred as a position table (the positions of the areas of interest on the first frame image to the 360th frame image) to an AFFINE transformation section 36. The AFFINE transformation section 36 performs AFFINE transformation for each DSA image to shift the region of interest to the image center on the basis of the position table (step S5").

The respective images after shift processing are subjected to grayscale conversion in an LUT 34 and continuously displayed on a TV monitor 42 (step S6"). At this time, if the moving image based on the 2D images and the 3D image are simultaneously displayed, the operator can make an observation more intuitively.

Note that, in this simultaneous display, it is preferable that the moving image based on the 2D images and the 3D image are synchronously displayed. In addition, the moving image based on the 2D images and the 3D image are displayed with the same magnifying power. These configuration are performed by the correspondence between the 3D coordinate system and the 2D coordinate system.

According to the above arrangement, areas of interest can be designated on all images used for moving image display by designating a region of interest on a 3D image once. This therefore makes it possible to reduce the operation load on the operator and improve the operation efficiency.

In addition, the operator can observe a target region in detail by using a 3D image and a moving image constituted by 2D images. For example, the operator can understand the structure of a diagnosis target with a 3D image and observe a region of interest in detail with a moving image.

FIFTH EMBODIMENT

The fifth embodiment of the present invention will be described next. An apparatus according to this embodiment is designed to designate a region as a region of interest and shift the region to the image center (i.e., the appropriate position). In this case, a region of interest and a rotation center for pseudo rotational display (to be simply referred to as a "rotation center" hereinafter) must be designated.

EXAMPLE 1

Figure 15:
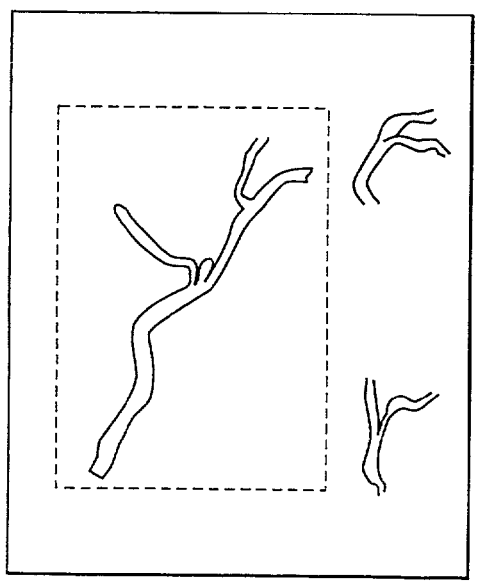
FIG. 15 is a view showing an example of an X-ray image displayed on a TV monitor 42 with a region of interest being designated.

An example of designating a rotation center after designating a region of interest on a 2D image will be described first with reference to FIGS. 15 and 16.

A region of interest is designated on an X-ray image on a TV monitor 42 through an input unit 40. FIG. 15 shows an example of the X-ray image displayed on the TV monitor 42 with a region of interest designated. The region enclosed with the dotted line is the designated region of interest. The region of interest that is designated in this manner and has a predetermined size is enlarged according to the screen size of the TV monitor 42, as shown in FIG. 16. This makes it possible to observe the image obtained by extracting only the region of interest.

Figure 16:
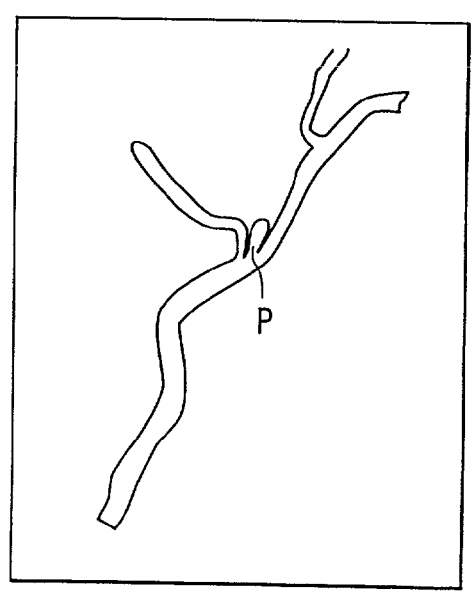
FIG. 16 is a view showing a region of interest enlarged according to the screen size of the TV monitor 42.

A rotation center P like the one shown in FIG. 16 is designated on the region of interest enlarged according to the screen size of the TV monitor 42.

Subsequently, areas of interest and rotation centers P on the remaining images are estimated in accordance with the contents described above, and the rotation center P is shifted to each image center. If the images after shift processing are continuously displayed, the region of interest can always be displayed in the image center.

EXAMPLE 2

An example of designating a region of interest after designating a rotation center on a 2D image will be described next with reference to FIGS. 17 and 18.

Figure 17:
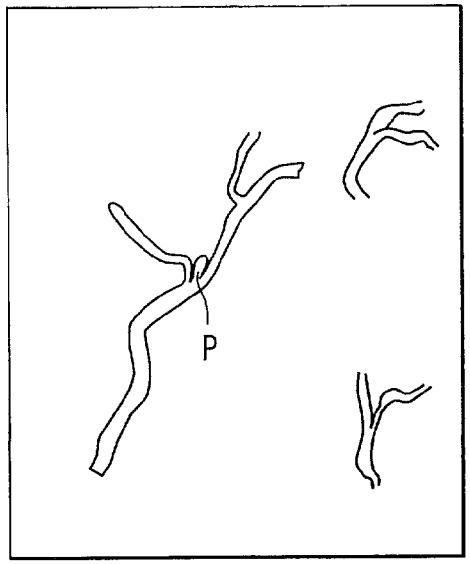
FIG. 17 is a view showing an example of an X-ray image displayed on the TV monitor 42 with a rotation center P being designated.
Figure 18:
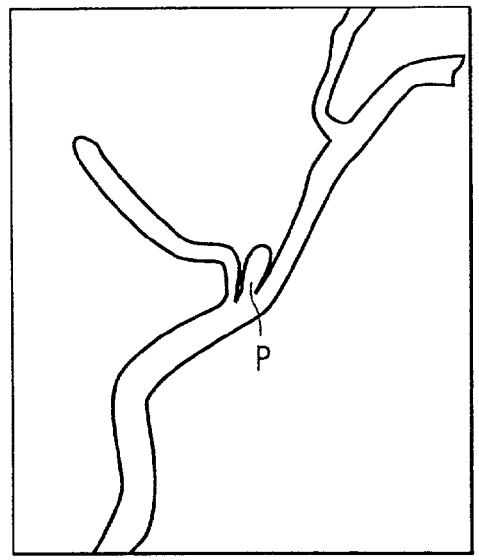
FIG. 18 is a view showing a region of interest enlarged according to the screen size of the TV monitor 42.

First of all, as shown in FIG. 17, a rotation center is designed on an X-ray image on a TV monitor 42 through an input unit 40.

A region of interest having a predetermined size is then automatically designated on the basis of the rotation center P. As shown in FIG. 18, the image is enlarged according to the screen size of the TV monitor 42. This makes it possible to observe an image with only a region of interest extracted. Note that a region of interest to be automatically set can be controlled to an arbitrary shape, size, and the like. With this operation, a region of interest corresponding to the shape of a diagnosis target can be set.

Subsequently, areas of interest and rotation centers P are estimated on the remaining images in accordance with the contents described above, and each rotation center P is shifted to the image center. If the images after shift processing are continuously displayed, the region of interest can always be displayed in the image center.

EXAMPLE 3

An example of designating a region of interest on a 3D image will be described next.

First of all, a region of interesting is designed on an 3D image on a TV monitor 42 through an input unit 40. In response to the designation of the region of interesting on an 3D image, each of regions of interesting in 2D images is extracted on the bases of the correspondence between the 3D coordinate system and the 2D coordinate system. The region of interest that is extracted in this manner and has a predetermined size is enlarged according to the screen size of the TV monitor 42, as shown in FIG. 16.

A rotation center P like the one shown in FIG. 16 is designated on the region of interest enlarged according to the screen size of the TV monitor 42.

Note that, the designation of the rotation center P also may be executed on the 3D image. In this case, the estimation of the rotation center P on 2D images can be executed according to the correspondence between the 3D coordinate system and the 2D coordinate system.

SIXTH EMBODIMENT

The sixth embodiment of the present invention will be described next.

The sixth embodiment can be applied to any of the apparatuses according to the first to fifth embodiments and is an apparatus having an arrangement that facilitates observation in moving image display.

In the first to fifth embodiments, a moving image is displayed by continuously displaying all images after shift processing. Consequently, in each image, even a region other than an observation target including a region of interest, i.e., an image region of no interest, is displayed. This may cause a deterioration in the power of concentration or observation.

In contrast to this, the apparatus according to this embodiment has an arrangement for narrowing a display range to display only a predetermined range from a region of interest in each image. For example, this predetermined range may be rectangular or circular. With regard to the shape and size of this range, the [Shutter] button is included in a toolbar in a display window, and a plurality of types of shapes, e.g., a circle and rectangle, are included in a pull-down menu corresponding to the button. When a target shape is selected from these shapes, an image is displayed within the selected shape.

Figure 19:
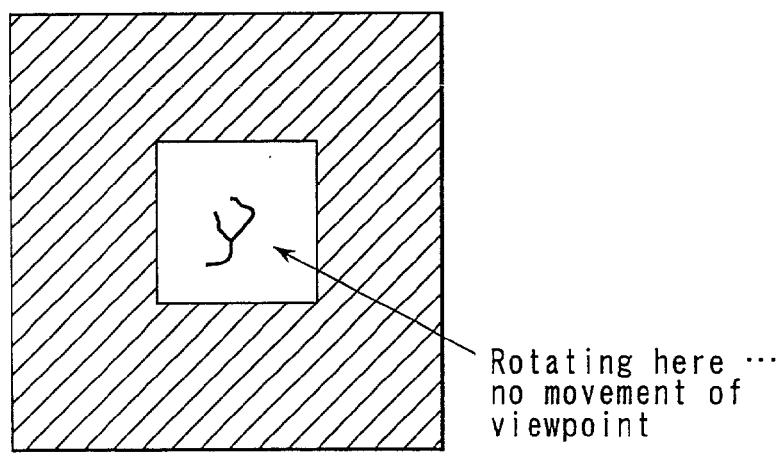
FIG. 19 is a view schematically showing a blood vessel displayed as a moving image when a square is selected.

FIG. 19 is a schematic view showing a blood vessel displayed as a moving image when a square is selected. As shown in FIG. 19, an unnecessary region is masked, the blood vessel is displayed in the image center. This allows the operator to observe the image with high power of concentration and observation without moving the viewpoint.

Note that when a shape is selected, another window is displayed, and the size of the shape can be designated in this window. For example, a default value (e.g., ½ the matrix size) is set as the size of a predetermined region. This value can be increased/decreased by directly rewriting it or pressing the up/down key. In this case, the designated frame (only the frame line) is preferably superimposed on the image to clearly show a predetermined range.

What is claimed is:

1. An X-ray diagnostic apparatus comprising:
    a memory which stores a plurality of images, wherein the plurality of images are images acquired in a plurality of projection directions by rotation around an object to be examined;
    a designating section which designates a region of interest on at least one of the plurality of images acquired in a predetermined projection direction on the basis of an input from an operator;
    a position estimating section which estimates corresponding areas in each projection direction, which correspond to the region of interest in each projection direction, on the remaining images of the plurality of images;
    a transformation section which transforms the plurality of images so as to locate the region of interest and the respective corresponding areas at substantially a same display position; and
    a display section which after transformation by said transformation section sequentially displays the transformed images with display positions thereof adjusted such that an operator is free from moving an eyepoint to observe the transformed images.

2. The apparatus according to claim 1, wherein the corresponding region on each of the remaining images is determined on the basis of at least one of the designated region of interest, an angle of an imaging system corresponding to each image, a distance between an X-ray source and an X-ray detector image-receiving surface, and a detector size.

3. The apparatus according to claim 1, wherein when areas of interest are designated on at least two images, said position estimating section obtains a 3D position of a diagnosis target on the basis of straight lines connecting focal positions of an X-ray source in sensing the respective images on which the areas of interest are designated and the areas of interest, and projects the 3D position onto the remaining images of the plurality of images, thereby estimating the respective corresponding areas.

4. The apparatus according to claim 1, wherein when areas of interest are designated on at least two images, said position estimating section calculates a locus of the areas of interest in the image by using a function on the basis of the respective designated areas of interest, and obtains the corresponding areas on the remaining images on the basis of the locus.

5. The apparatus according to claim 4, wherein said position estimating section includes an interface which switches the function by manual operation.

6. The apparatus according to claim 4, wherein said position estimating section selects a function to be used in accordance with the number of areas of interest designated by an operator.

7. The apparatus according to claim 1, wherein said position estimation section performs correlation value computation associated with pixel values in the region of interest between at least two adjacent images of the plurality of images, and obtains the corresponding areas on the respective remaining images on the basis of the correlation values.

8. The apparatus according to claim 1, further comprising display range adjusting section which adjusts a display range of an image, after the transformation by said transformation section, by using a shutter having a predetermined shape.

9. The apparatus according to claim 8, wherein the predetermined shape can be set to an arbitrary shape.

10. An X-ray diagnostic apparatus comprising:
a memory which stores a plurality of 2D images acquired in a plurality of projection directions and which constitute a 3D image of a predetermined diagnosis target;
a designating section which allows an operator to designate a region of interest on the 3D image;
a position estimating section which estimates corresponding areas in each projection direction and which correspond in each projection direction to the region of interest designated on the 3D image, on the plurality of 2D images;
a transformation section which transforms the plurality of 2D images so as to locate the region of interest and the respective corresponding areas at substantially a same display position; and
a display section which after transformation by said transformation section sequentially displays the transformed images with display positions thereof adjusted such that an operator is free from moving an eyepoint to observe the transformed images.

11. The apparatus according to claim 10, wherein the plurality of 2D images are images acquired by rotation around an object to be examined.

12. The apparatus according to claim 10, wherein each of the corresponding areas on the plurality of 2D images is determined on the basis of at least one of the designated region of interest, an angle of an imaging system corresponding to each image, a distance between an X-ray source and an X-ray detector image-receiving surface, and a detector size.

13. The apparatus according to claim 10, further comprising display range adjusting section which adjusts a display range of a 2D image, after the transformation by said transformation section, by using a shutter having a predetermined shape.

14. The apparatus according to claim 13, wherein the predetermined shape can be set to an arbitrary shape.

15. An image processor comprising:
a memory which stores a plurality of images acquired in a plurality of projection directions;
a designating section which allows an operator to designate a region of interest on at least one of the plurality of images acquired in a predetermined projection direction;
a position estimating section which estimates corresponding areas in each projection direction on the remaining images of the plurality of images on the basis of a position of the designated region of interest in each projection direction;
a transformation section which transforms the plurality of images so as to locate the region of interest and the respective corresponding areas at substantially a same display position; and
a display section which after transformation by said transformation section sequentially displays the transformed images with display positions thereof adjusted such that an operator is free from moving an eyepoint to observe the transformed images.

16. The processor according to claim 15, wherein the plurality of images are images acquired by rotation around an object to be examined.

17. The processor according to claim 15, wherein said position estimating section calculates a locus of the region of interest on the image by using a function on the basis of the designated region of interest, and obtains the corresponding areas on the remaining image on the basis of the locus.

18. The processor according to claim 17, wherein said position estimating section includes an interface which switches the function by manual operation.

19. The processor according to claim 17, wherein said position estimating section selects a function to be used in accordance with the number of areas of interest designated by the operator.

20. The processor according to claim 15, wherein said position estimation section performs correlation value computation associated with pixel values in the region of interest between at least two adjacent images of the plurality of images, and obtains the corresponding areas on the respective remaining images on the basis of the correlation values.

21. The processor according to claim 15, further comprising a display range adjusting filter which adjusts a display range of an image, after the transformation by said transformation section, by using a shutter having a predetermined shape.

22. The processor according to claim 21, wherein the predetermined shape can be set to an arbitrary shape.

23. An image processor comprising:
a memory which stores a plurality of 2D images acquired in a plurality of projection directions and which constitute a 3D image of a predetermined diagnosis target;
a designating section which allows an operator to designate a region of interest on the 3D image;
a position estimating section which estimates corresponding areas in each projection direction and which correspond in each projection direction to the region of interest designated on the 3D image, on the plurality of 2D images
a transformation section which transforms the plurality of 2D images so as to locate the region of interest and the respective corresponding areas at substantially a same display position; and
a display section which after transformation by said transformation section sequentially displays the transformed images with display positions thereof adjusted such that an operator is free from moving an eyepoint to observe the transformed images.

24. The processor according to claim 23, wherein the plurality of 2D images are images acquired by rotation around an object to be examined.

25. The processor according to claim 23, wherein each of the corresponding areas on the plurality of 2D images is determined on the basis of at least one of the designated region of interest, an angle of an imaging system corresponding to each image, a distance between an X-ray source and an X-ray detector image-receiving surface, and a detector size.

26. The processor according to claim 23, further comprising display range adjusting means for adjusting a display range of a 2D image, after the transformation by said transformation section, by using a shutter having a predetermined shape.

27. The processor according to claim 26, wherein the predetermined shape can be set to an arbitrary shape.

28. An X-ray diagnostic apparatus comprising:
a memory which stores a plurality of images acquired in a plurality of projection directions;
a designating section which designates a region of interest on a first image acquired in a first predetermined projection direction of the plurality of images on the basis of an input from an operator;
a position estimating section which estimates a corresponding area, which corresponds to the region of interest, on a second image acquired in a second predetermined projection direction of the plurality of images;
a transformation section which transforms at least one of the first and second images so as to locate the region of interest and the respective corresponding area at substantially a same display position; and
a display section which after transformation by said transformation section sequentially displays the first image and the second image with display positions thereof adjusted such that an operator is free from moving an eyepoint to observe the first and second images.

29. The X-ray diagnostic apparatus of claim 28, wherein:
said position estimating section estimates corresponding areas, corresponding to the region of interest, on plural of the plurality of images stored in the memory;
said transformation section transforms at least one of the first image and the plural images for which corresponding areas are estimated so as to locate the region of interests and the respective corresponding areas at substantially the same display position; and
said display section after transformation by said transformation section displays the first image and the plural images with the region of interest of the first image and the corresponding areas of the plural images at the substantially same display position.

30. An X-ray diagnostic apparatus comprising:
a memory which stores a plurality of images acquired in a plurality of projection directions;
a designating section which designates a region of interest on at least one of the plurality of images acquired in a predetermined projection direction on the basis of an input from an operator;
a position estimating section which estimates corresponding areas in each projection direction, which correspond to the region of interest in each projection direction, on the remaining images of the plurality of images;
a transformation section which transforms the plurality of images so as to locate the region of interest and the respective corresponding areas at substantially a same display position; and
a display section which sequentially displays the transformed images with display position thereof adjusted so that an operator is free from moving an eyepoint to observe the transformed images.

31. An X-ray diagnostic apparatus comprising:
a memory which stores a plurality of 2D images acquired in a plurality of projection directions and which constitutes a 3D image of the predetermined diagnosis target;
a designating section which allows an operator to designate a region of interest on the 3D image;
a position estimating section which estimates corresponding areas in each projection direction and which correspond to the region of interest designated on the 3D image, on the plurality of 2D images;
a transformation section which transforms the plurality of 2D images so as to locate the region of interest and the respective corresponding areas at substantially a same display position; and
a display section which sequentially displays the transformed images with display positions thereof adjusted so that an operator is free from moving an eyepoint to observe the transformed images.

32. An image processor comprising:
a memory which stores a plurality of images acquired in a plurality of projection directions;
a designating section which allows an operator to designate a region of interest on at least one of the plurality of images acquired in a predetermined projection direction;
a position estimating section which estimates corresponding areas in each projection direction on the remaining images of the plurality of images on the basis of a position of the designated region of interest in each projection direction:
a transformation section which transforms the plurality of images so as to locate the region of interest and the respective corresponding areas at substantially a same display position; and
a display section which sequentially displays the transformed images with the display positions thereof adjusted so that an operator is free from moving an an eyepoint to observe the transformed images.

33. An image processor comprising:
a memory which stores a plurality of 2D images acquired in a plurality of projection directions and which constitutes a 3D image of the predetermined diagnosis target;
a designating section which allows an operator to designate a region of interest on the 3D image;
a position estimating section which estimates corresponding areas in each projection direction and which correspond to the region of interest in each projection direction designated on the 3D image, on the plurality of 2D images;
a transformation section which transforms the plurality of 2D images so as to locate the region of interest and the respective corresponding areas at substantially a same display position; and
a display section which sequentially displays the transformed images with display positions thereof adjusted so that an operator is free from moving an eyepoint to observe the transformed images.

34. An X-ray diagnostic apparatus comprising:
a memory which stores a plurality of images acquired in a plurality of projection directions;
a designating section which designates a region of interest on a first image of the plurality of images acquired in a predetermined projection direction on the basis of an input from an operator;
a position estimating section which estimates in a second projection direction a corresponding area, which corresponds to the region of interest, on a second image of the plurality of images;
a transformation section which transforms at least one of the first and second images so as to locate the region of interest and the respective corresponding area at substantially a same display position; and a display section which sequentially displays the transformed images with display positions thereof adjusted so that an operator is free from moving an eyepoint to observe the transformed images.

35. The X-ray diagnostic apparatus of claim 1, further comprising:

wherein the transformation section calculates an amount of movement in each image based on an angle of rotation of an image pickup system for acquiring the plurality of images, and transforms the plurality of images based on the calculated amount of movement in each image.

36. The X-ray diagnostic apparatus of claim 10, further comprising:

wherein the transformation section calculates an amount of movement in each image based on an angle of rotation of an image pickup system for acquiring the plurality of images, and transforms the plurality of images based on the calculated amount of movement in each image.

37. The image processor of claim 15, further comprising:
wherein the transformation section calculates an amount of movement in each image based on an angle of rotation of an image pickup system for acquiring the plurality of images, and transforms the plurality of images based on the calculated amount of movement in each image.

38. The image processor of claim 23, further comprising:
wherein the transformation section calculates an amount of movement in each image based on an angle of rotation of an image pickup system for acquiring the plurality of images, and transforms the plurality of images based on the calculated amount of movement in each image.

39. The X-ray diagnostic apparatus of claim 28, further comprising:

wherein the transformation section calculates an amount of movement in each image based on an angle of rotation of an image pickup system for acquiring the plurality of images, and transforms the plurality of images based on the calculated amount of movement in each image.

40. The X-ray diagnostic apparatus of claim 30, further comprising:

wherein the transformation section calculates an amount of movement in each image based on an angle of rotation of an image pickup system for acquiring the plurality of images, and transforms the plurality of images based on the calculated amount of movement in each image.

41. The image processor of claim 31, further comprising:
wherein the transformation section calculates an amount of movement in each image based on an angle of rotation of an image pickup system for acquiring the plurality of images, and transforms the plurality of images based on the calculated amount of movement in each image.

42. The image processor of claim 32, further comprising:
wherein the transformation section calculates an amount of movement in each image based on an angle of rotation of an image pickup system for acquiring the plurality of images, and transforms the plurality of images based on the calculated amount of movement in each image.

43. The image processor of claim 33, further comprising:
wherein the transformation section calculates an amount of movement in each image based on an angle of rotation of an image pickup system for acquiring the plurality of images, and transforms the plurality of images based on the calculated amount of movement in each image.

44. The X-ray diagnostic apparatus of claim 34, further comprising:

wherein the transformation section calculates an amount of movement in each image based on an angle of rotation of an image pickup system for acquiring the plurality of images, and transforms the plurality of images based on the calculated amount of movement in each image.

* * * * *